United States Patent [19]

Marecki

[11] Patent Number: 5,631,064
[45] Date of Patent: May 20, 1997

[54] RETROREFLECTIVE TRANSFER SHEET AND APPLIQUE

[75] Inventor: Paul E. Marecki, May Township, Minn.

[73] Assignee: Minnesota Mining and Manufacturing Company, St. Paul, Minn.

[21] Appl. No.: 528,727

[22] Filed: Sep. 15, 1995

[51] Int. Cl.⁶ ............................ D06Q 1/12; B41M 3/12; G02B 5/128; B32B 5/16
[52] U.S. Cl. .................. 428/143; 428/149; 428/325; 428/187; 428/79; 428/200; 428/202; 428/913; 359/518; 359/538; 359/540
[58] Field of Search .................. 428/143, 149, 428/325, 187, 79, 200, 202, 913; 359/518, 538, 540

[56] References Cited

U.S. PATENT DOCUMENTS

| | | | |
|---|---|---|---|
| 3,700,305 | 10/1972 | Bingham | 350/105 |
| 3,758,192 | 9/1973 | Bingham | 350/105 |
| 3,806,397 | 4/1974 | Kukoff | 161/4 |
| 3,971,692 | 7/1976 | Anderson | 156/241 |
| 4,102,562 | 7/1978 | Harper et al. | 350/105 |
| 4,192,576 | 3/1980 | Tung et al. | 350/105 |
| 4,367,919 | 1/1983 | Tung et al. | 350/105 |
| 4,392,901 | 7/1983 | Pernicano et al. | 156/155 |
| 4,564,556 | 1/1986 | Lang et al. | 428/325 |
| 4,605,461 | 8/1986 | Ogi | 156/233 |
| 4,609,587 | 9/1986 | Giordano et al. | 428/325 |
| 4,756,931 | 7/1988 | Giordano et al. | 427/163 |
| 4,758,469 | 7/1988 | Lange | 428/325 |
| 4,763,985 | 8/1988 | Bingham | 350/105 |
| 4,772,511 | 9/1988 | Wood et al. | 428/325 |
| 4,931,414 | 6/1990 | Wood et al. | 501/103 |
| 5,130,402 | 7/1992 | Akiyama et al. | 528/45 |
| 5,200,262 | 4/1993 | Li | 428/266 |
| 5,283,101 | 2/1994 | Li | 428/141 |
| 5,344,705 | 9/1994 | Olsen | 428/323 |
| 5,474,827 | 12/1995 | Crandall et al. | 428/67 |
| 5,478,628 | 12/1995 | Billingsley et al. | 428/171 |
| 5,503,906 | 4/1996 | Olsen | 428/195 |

FOREIGN PATENT DOCUMENTS

| | | | |
|---|---|---|---|
| 294936 | 12/1988 | European Pat. Off. | B41M 3/12 |
| 92/07990 | 5/1992 | WIPO | D06Q 1/12 |

OTHER PUBLICATIONS

J. A. Brydson, *Plastics Materials, Fifth Ed.*; Butterworths: London; pp. 75–85, 125–126 (1989).

K. L. Chopra, *Thin Films Phenomena*; McGraw Hill: New York; p. 750 (1969).

*Primary Examiner*—William Watkins
*Attorney, Agent, or Firm*—Gary L. Griswold; Walter N. Kirn; Karl G. Hanson

[57] ABSTRACT

The present invention relates to retroreflective transfer sheets and graphic images produced therefrom, i.e., appliques. The retroreflective applique includes: a layer of optical lens elements partially embedded in and protruding from the front surface of a binder resin layer and a transfer adhesive layer comprising a vinyl plastisol disposed on the rear surface of the binder resin layer. The binder resin layer is prepared from ingredients comprising an isocyanate-functional hardener and a resin selected from the group consisting of a polyester resin and a polyurethane resin.

35 Claims, 2 Drawing Sheets

RETROREFLECTIVE TRANSFER SHEET AND APPLIQUE

FIELD OF THE INVENTION

The present invention relates to retroreflective transfer sheets and graphic images produced therefrom, i.e., appliques.

BACKGROUND OF THE INVENTION

During the growth in popularity of decorative appliques on garments such as T-shirts or jackets, there has been a continuing desire for ways to make such appliques retroreflective. Retroreflective appliques have the ability to return a substantial portion of incident light in the direction from which the light originated. On an outer garment worn at night, such retroreflective appliques provide a bright return of light to oncoming motorists, thereby adding a safety feature, as well as increased decorative appeal, to the garments.

A retroreflective applique typically includes a layer of optical lens elements, a polymeric binder layer, and a specular reflective layer. The optical lens elements usually are transparent microspheres that are partially embedded in the polymeric binder layer such that a substantial portion of each microsphere protrudes from the polymeric binder layer. The specular reflective layer is disposed on the portion of the transparent microsphere that is embedded in the polymeric binder layer and typically comprises aluminum, silver, or a dielectric mirror. Light striking the front surface of the retroreflective applique passes through the transparent microspheres, is reflected by the specular reflective layer, and passes back through the transparent microspheres to travel back in the direction of the light source.

Several methods are known or have been proposed to provide such retroreflective appliques. One such method involves applying a layer of glass microspheres over a printed design; however, this layered product is stiff and unsuitable for conformable garments. Another method involves silk-screening a design onto a garment, and then while the design is still wet, cascading microspheres onto the design; however, such an approach is messy, usually provides a nonuniform deposit of microspheres, and is impractical for obtaining high reflective brightness. Yet another method involves mixing hemispherically specularly coated glass microspheres into ink and printing this onto the garment; however, this results in a reduced retroreflectance because the hemispherically coated microspheres are randomly oriented within an applied coating.

In addition to being conformable or drapable so they can be used on garments, retroreflective appliques should be able to withstand laundering conditions. Examples of launderable retroreflective appliques are disclosed in U.S. Pat. No. 4,763,985 (Bingham), U.S. Pat. No. 5,200,262 (Li), and U.S. Pat. No. 5,283,101 (Li). These appliques, however, are not imagewise printed appliques, nor are they prepared using compositions having a viscosity or volatility that are suitable for imagewise printing, especially by screen printing. Furthermore, retroreflective appliques having multicolored designs are particularly desirable. Examples of multicolored retroreflective appliques are disclosed in U.S. Pat. No. 4,102,562 (Harper et al.) and U.S. Pat. No. 5,344,705 (Olsen), and PCT Application No. WO 92/07990 (Olsen et al.). Retroreflective appliques that can be multicolored, conformable and drapable, and exhibit very little loss of retroreflective brightness after a significant number of washings, are extremely desirable.

U.S. Pat. No. 5,344,705 (Olsen) and PCT Application No. WO 92/07990 (Olsen et al.) disclose a retroreflective transfer sheet material comprising a base sheet; a continuous layer of transparent microspheres partially embedded in a heat-softenable layer on the base sheet; a two-part resin composition comprising a polyester and an isocyanate hardener printed on the microsphere layer in an imagewise pattern; a two-part resin composition comprising a polyurethane or a polyester, an isocyanate hardener, and reflective flakes printed directly on the microspheres or on the polyurethane-based resin; and a two-part extender resin comprising a polyurethane or a polyester and an isocyanate hardener printed in an imagewise pattern. Before the extender resin is hardened, a powdered hot melt adhesive is applied to the wet image. This powdered hot melt adhesive must be fused into the extender resin through the application of heat. After the image dries, the powdered hot melt adhesive is removed from the nonimage areas. This transfer sheet material is used by laying it on a substrate, with the transfer layer against the substrate, adhering the transfer layer to the substrate, and then stripping the base sheet and heat-softenable layer away.

The resulting transferred applique shows good home wash durability; however, the image is generally stiff and hard. This attribute leads to cracking when the fabric having the applique thereon is washed or flexed. These cracks serve as erosion and abrasion sites for further image and brightness degradation during wear and laundering. If appliques made with these systems are applied to a substrate fabric that stretches, the image will break or crack open, leaving islands of the now broken image that move with the stretched fabric. When the fabric is allowed to return to its rest position, the islands of image do not completely join to reform an uninterrupted image. The cracks between image pieces remain open and are sites where wash erosion and wear abrasion can start.

U.S. Pat. No. 4,102,562 (Harper et al.) discloses appliques that are softer and more flexible than the appliques of Olsen; however, they do not wash well. The Harper et al. transfer sheet comprises a base sheet; a continuous layer of transparent microspheres partially embedded in a heat-softenable layer on the base sheet; a specular reflective layer (typically, a dielectric mirror) deposited onto the exposed surfaces of the microspheres; and a thick transfer layer (typically, a color layer) of a vinyl plastisol ink printed over the microsphere layer in an imagewise pattern. An adhesion-promoting layer comprising a silane is coated on the microspheres prior to the vinyl plastisol ink being coated thereon. This adhesion-promoting layer includes either a glycidoxypropyltrimethoxysilane or a polyurethane and a silane having reactivity toward polyurethane. Although Harper et al. disclose that they believe the silane provides a chemical linkage between the vinyl plastisol ink and the glass beads, the applique does not retain its retroreflective brightness because the microspheres tend to fall off after only a few washings. In fact, Harper et at. disclose that after only five machine washings, the appliques on sample garments displayed a 60% loss in retroreflectivity.

Thus, what is needed is a retroreflective applique that is softer, more durable, and easier to manufacture than conventional retroreflective appliques and transfer sheets for applying such appliques to a substrate, such as an article of clothing, for example.

SUMMARY OF THE INVENTION

The present invention provides a retroreflective applique comprising: a layer of optical lens elements partially embedded in and protruding from the front surface of a binder resin layer; wherein the binder resin layer is prepared from ingredients comprising an isocyanate-functional hardener and a resin selected from the group consisting of a polyester resin and a polyurethane resin; and a transfer adhesive layer comprising a vinyl plastisol disposed on the rear surface of the binder resin layer. To impart retroreflectivity, the optical lens elements can be coated with a specular reflective material on the surface embedded in the binder resin layer. Alternatively, reflective flakes can be distributed throughout the binder resin layer. The retroreflective applique of the present invention is particularly advantageous because it is capable of retaining at least about 50% of its initial retroreflectivity after being laminated to 65/35 polyester/cotton blend fabric (100 g/m$^2$) at about 168° C. and about 2.8 Kg/cm$^2$ pressure for about 20 seconds and subjected to home laundering conditions five times, and at least about 40% of its initial retroreflectivity after being laminated to 65/35 polyester/cotton blend fabric (100 g/m$^2$) at about 168° C. and about 2.8 Kg/cm$^2$ pressure for about 20 seconds and subjected to home laundering conditions thirty times.

The present invention also provides a retroreflective applique transfer sheet comprising the retroreflective applique discussed above and a carrier comprising a layer of a heat-softenable material; wherein the layer of optical lens elements in the retroreflective applique is partially embedded in the heat-softenable material. Preferably, the binder resin layer is disposed on the optical lens elements in an imagewise fashion and the transfer adhesive layer is disposed on the binder resin layer in an imagewise fashion in register with the binder layer image.

The present invention also provides a kit for preparing a retroreflective applique comprising:

(a) a base sheet material comprising:
  (i) a carrier comprising a heat-resistant backing and a layer of a heat-softenable material coated thereon; and
  (ii) a layer of optical lens elements partially embedded in and protruding from the heat-softenable material;
(b) ingredients for preparation of a binder resin composition comprising:
  (i) an isocyanate-functional hardener; and
  (ii) a resin selected from the group consisting of a polyester resin and a polyurethane resin;
  wherein the binder resin composition is suitable for imagewise printing on the base sheet material; and
(c) a transfer adhesive composition comprising a vinyl plastisol suitable for imagewise printing.

The base sheet material of the kit can be a vapor coated sheet material comprising: a carrier comprising a heat-resistant backing and a layer of a heat-softenable material coated thereon; a layer of optical lens elements partially embedded in and protruding from the heat softenable material; and a specular reflective material coated on the surfaces of the optical lens elements protruding from the heat-softenable material. Alternatively, the kit can include reflective flakes for mixing with the binder resin composition or the transfer adhesive composition.

Also provided is a method for preparing a retroreflective applique; the method comprising:

(a) providing a base sheet material comprising:
  (i) a carrier comprising a heat-resistant backing and a layer of a heat-softenable material coated thereon; and
  (ii) a layer of optical lens elements partially embedded in and protruding from the heat-softenable material;

(b) imagewise printing a binder resin composition on the base sheet material, wherein the binder resin composition is prepared from ingredients comprising:
  (i) an isocyanate-functional hardener; and
  (ii) a resin selected from the group consisting of a polyester resin and a polyurethane resin;
(c) imagewise printing a transfer adhesive composition comprising a vinyl plastisol in register with the image formed with the binder resin composition to form a retroreflective applique transfer sheet.

DETAILED DESCRIPTION OF THE INVENTION

The present invention provides a retroreflective applique, transfer sheet bearing the retroreflective applique, an article, such as an article of clothing, bearing a transferred applique, a kit for preparing the applique, a method for preparing the retroreflective transfer sheet, and a method for applying the applique to a substrate. The appliques of the present invention display substantial improvements over conventional appliques with respect to durability, flexibility, stretch, and types of substrates to which they can be applied. Particularly preferred embodiments of the present invention are: (a) capable of reproducing complex images without costly and complex "weeding" operations (that is, without having to remove imaging material not part of the imaged region); (b) very durable to home laundering conditions, as measured by retention of a large portion of its original retroreflective brightness after a large number of launderings; and (c) very soft and flexible such that the transferred applique approaches and preferably takes on the drape and flexibility of the fabric itself.

The retroreflective appliques of the present invention include a layer of optical lens elements, such as glass microspheres, which are preferably coated with a specular reflective material, and a transfer adhesive comprising a vinyl plastisol. As used herein, a plastisol comprises finely divided resin particles, such as polyvinyl chloride particles, dispersed in a compatible plasticizer. It typically does not include organic solvents. As used in this context, "compatible" means that the resin particles can coexist on the molecular scale with the plasticizer such that the resin particles and plasticizer form a stable association with each other. Typically, this means that the resin particles are capable of being substantially solubilized in the plasticizer at an elevated temperature. Preferably, the solubility parameter $\delta$, which is an experimentally determined property (i.e., $[(L-RT)/(M/D)]^{1/2}$ wherein L is the latent heat of vaporization, R is the gas constant, T is the absolute temperature, M is molecular weight, and D is density), for the resin particles is within about two units (MPa$^{1/2}$) of the solubility parameter of the plasticizer. Further discussion of the solubility parameter can be found in J. A. Brydson, *Plastics Materials*, 5th edition, Butterworths, London, pages 75–84 and 125–126 (1989).

In the plastisols used in the present invention, the resin particles typically have a particle size of about 0.5–150 micrometers. If the particle size of the resin particles is about 0.5–2 micrometers, it is typically considered a "dispersion" resin. If the particle size of the resin particles is about 10–150 micrometers, it is typically considered an "extender" resin. A typical composition includes about 60–100 parts dispersion resin, about 0–40 parts extender resin, and about 30–100 parts plasticizer. Typically, the plastisol is in the form of a paste that gels when heated as a result of solvation of the resin particles by the plasticizer.

Typically, because plastisols are in the form of a paste, they are particularly desirable for application of thick layers, although it is desirable that they be of a consistency suitable for printing. Furthermore, they can be printed in organic solvent-free form and then gelled upon the application of heat for a short period of time. This gelled state results from partial dissolution of the particles in the plasticizer and partial coalescence of the particles to form a very weak image that is generally dry to the touch and can withstand mild rubbing without smearing. Once in the gelled state, the further application of heat during lamination causes the gelled plastisol to temporarily soften and flow and/or penetrate a substrate, such as a fabric. During this process the particles are further dissolved by the plasticizer, and upon cooling, they are fused into a hard rugged image.

A wide variety of vinyl plastisols can be used as the transfer adhesive in the retroreflective appliques and transfer sheets of the present invention. Homopolymer resin plastisols as well as copolymer resin plastisols can be used. Homopolymer resins comprise particles polymerized from a single monomer unit, such as vinyl chloride, whereas copolymer resins comprise particles polymerized from mixtures of monomers. A preferred class of resins are resins made from vinyl chloride monomers. Copolymers made from vinyl chloride and a monomer selected from the group consisting of vinyl acetate, maleic anhydride, maleic acid, a maleic acid ester, vinyl ether, acrylic acid, an acrylic acid ester, and mixtures thereof may also be used. Copolymers that include carboxylated monomer units tend to adhere more tightly to glass and metal surfaces; however, they are also difficult to work with because they are very viscous. Thus, they do not print in an imagewise fashion easily and are therefore less desirable vinyl plastisols for use in the present invention. Furthermore, the improvement in wash durability obtained using copolymers that include carboxylated monomer units compared with appliques made with homopolymer plastisols, is much less than the improvement achieved by the present invention. Thus, a preferred class of vinyl resins are made from monomers selected from the group consisting of vinyl chloride, vinyl acetate, vinyl ether, and mixtures thereof. A particularly preferred class of vinyl resins are made from vinyl chloride and a monomer selected from the group consisting of vinyl acetate, vinyl ether, and mixtures thereof.

A wide variety of plasticizers suitable for use in the vinyl plastisols that can be used as transfer adhesives in the present invention include nonvolatile organic liquids. Typical classes of plasticizers that are compatible with vinyl particles include, but are not limited to, terephthalate esters, isophthalate esters, and orthophthalate esters, nonlimiting examples of which include butyl benzyl phthalate, dihexyl phthalate, di-2-ethylhexyl phthalate, diisooctyl phthalate, diisononyl phthalate, and ditridecyl phthalate; adipates, nonlimiting examples of which include dioctyl adipate, diisononyl adipate, di-2-ethylhexyl adipate, and adipates of straight chain $C_6$–$C_{10}$ alcohols; azelates, nonlimiting examples of which include dioctyl azelate and diisooctyl azelate; sebacates, nonlimiting examples of which include dioctyl sebacate; trimellitates, nonlimiting examples of which include trioctyl trimellitate and triisononyl trimellitate; polymeric plasticizers with a molecular weight of about 1,000–10,000 resulting from the esterification of dibasic acids with glycols; phosphates, nonlimiting examples of which include tricresylphosphate, cresyldiphenylphosphate, and octyldiphenylphosphate; and epoxides, a nonlimiting example of which is epoxidized soybean oil. These materials may be used alone or in combination and are typically commercially available. For example, diisononyl phthalate is commercially available under the trade designation "JAY-FLEX DINP" from Exxon Chemical Co., Houston, Tex.; di-2-ethylhexyl adipate is commercially available under the trade designation "PX-238" from Aristech Chemical Co., Pittsburgh, Pa.; trioctyl trimellitate is commercially available under the trade designation "PX-338" from Aristech Chemical; tricresylphosphate is commercially available under the trade designation "KRONITEX TCP" from FMC Corporation, Philadelphia, Pa.; and epoxidized soybean oil is commercially available under the trade designation "PX-800" from Aristech Chemical.

Suitable vinyl plastisols can be prepared by combining at least one type of vinyl resin with at least one type of compatible plasticizer, as discussed above. Although the inventor does not wish to be held to any particular theory, the plasticizer tends to soften the vinyl resin and lower its processing temperature. Thus, vinyl plastisols can typically be fused at temperatures as low as about 150° C., which is desirable for application of the appliques of the present invention. Suitable plastisols are also commercially available.

A plastisol can also include additives such as heat stabilizers, fillers, colorants, volatile diluents, and the like. Heat stabilizers, such as Ba-Cd-Zn stabilizers available under the trade designations "S-1861" and "1528" from Synthetic Products Company, Cleveland, Ohio, and the like, aid in the prevention of polymer degradation caused by processing heat. If a heat stabilizer is used, it will typically be used in an amount of about 0.5–5 parts by weight, based on 100 parts vinyl resin. Surface active agents, such as those available under the trade designations "BYK 3105" and "BYK 4010" from Byk-Chemie, USA, Wallingford, Conn., and the like, can be included in the plastisol formula to adjust viscosity and to assist in keeping a desired viscosity stable over time. If a surface active agent is used, it will typically be used in an amount of about 0.1–3 parts by weight, based on 100 parts vinyl resin. Colorants, i.e., dyes or pigments, such as those available under the trade designations "81Y312," "81S284," and "81R278" from Penn Color Co., Doylestown, Pa., and the like, can be included to impart opacity, color, or weatherability properties. If a colorant is used, it will typically be used in an amount of about 0.5–5 parts by weight, based on 100 parts of vinyl resin. Fillers, such as chalks, clays, silica, and the like, may also be present in a plastisol formula to reduce cost, increase viscosity, or adjust electrical, tack, or scuff properties. If a filler is used, it will typically be used in an amount of up to about 50 parts by weight, based on 100 parts vinyl resin. Powdered or liquid adhesive enhancers can also be included to improve the adhesion of the image layer to its substrate.

These can be of the hot melt powdered type such as polyamide or polyester hot melt adhesives, or they can be of the liquid resin type such as isocyanate resins, epoxy resins, or melamines. If a powdered or liquid adhesive enhancer is used, it will typically be used in an amount of about 0.5–5 parts by weight, based on 100 parts vinyl resin. Each of these types of additives provides some advantage for the specific application for which the plastisol is intended.

Examples of commercially available vinyl plastisols include those sold under the trade designations "PLUS 9090" from Union Ink Company, Inc., Ridgefield, N.J., "TRANSFLEX 10210TF" from Flexible Products Company, Kennesaw, Ga., and "SX 864A," "SX 864B," "SX 864C," "SX 864D," "SX 874A," "SX 874B," and "SX 863," all of which are available from Plast-O-Meric SP, Inc., Sussex, Wis. All of these comprise vinyl particles uniformly dispersed in a plasticizer, such as an orthophthalate ester. Although these vinyl plastisols are colorless, similar ones are available that include colorants.

Typically, plastisols, particularly vinyl plastisols, do not adhere well to glass, metals, metal oxides or hydroxides, or dielectric metal complexes. Thus, the use of vinyl plastisols directly on coated glass microspheres, for example, in retroreflective appliques typically leads to poor wash durability. The present invention provides a method that involves the use of a binder layer of a two-part resin system prepared from ingredients comprising a polyester resin or a polyurethane resin and an isocyanate-functional hardener, which is often referred to simply as an "isocyanate" hardener. The isocyanate-functional hardener improves the performance of the resin system by crosslinking the resin. If the isocyanate-functional hardener were left out of the binder resin composition, the resulting image would not attain satisfactory strength and durability. The image would be generally easily degraded by mild abrasion and would quickly lose its retroreflective brightness after a small number of home launderings. The two-part resin system that is used in the binder resin layer is discussed in more detail below.

The retroreflective appliques and articles of clothing bearing them have been found to exhibit surprising retention of retroreflective brightness after being repeatedly laundered. This advantageous result is achieved through increased resistance to loss of retroreflective elements due to binding the vinyl plastisol to the optical lens elements. Consequently, articles bearing the retroreflective appliques of the present invention can be cleaned more times than previously thought possible while still retaining the desired retroreflective character.

When laminated to 65/35 polyester/cotton blend fabric (100 g/m$^2$) at about 168° C. and about 2.8 Kg/cm$^2$ pressure for about 20 seconds, retroreflective appliques of the present invention retain at least about 50%, preferably at least about 75%, and more preferably at least about 90%, of their initial retroreflectivity after being subjected to home laundering conditions five times. Similarly, when laminated to 65/35 polyester/cotton blend fabric (100 g/m$^2$) at about 168° C. and about 2.8 Kg/cm$^2$ pressure for about 20 seconds, retroreflective appliques of the present invention retain at least about 40%, and preferably at least about 50%, of their initial retroreflectivity after being subjected to home laundering conditions thirty times. As used herein, "initial retroreflectivity" refers to the retroreflectivity of the laminated applique before laundering. As used herein, "home laundering conditions" refer to the procedure described in the Examples Section. Briefly, this includes washing each sample for five consecutive cycles in a Maytag Model LS7804 automatic washing machine ("Regular" fabric (setting 10); "Large" load; and "Hot/Cold" temperature using an initial water temperature of about 43° C.) with 40 grams of a standard detergent per wash cycle. After every fifth wash/rinse cycle, each sample is tumble-dried in a Maytag Model LS7804 dryer until the total load is dried (60° C. temperature and "Regular" fabric), and then tumbled for a 5–10 minute cooling period with the heat turned off.

The appliques of the present invention also demonstrate significant flexibility and stretchiness. For example, when subjected to the flexibility test described below in the Examples Section, appliques of the present invention demonstrate significantly higher angles of deflection (at least about three times as great) from horizontal than do appliques made using the same binder resin but a powdered hot melt transfer adhesive. Furthermore, when subjected to the stretch test described below in the Examples Section, appliques of the present invention demonstrate significantly greater stretchiness before cracks, pinholes, etc., can be detected, than do appliques made using the same binder resin but a powdered hot melt transfer adhesive. Typically, appliques of the present invention can be stretched such that they are increased in size by at least about 100% before cracks, pinholes, etc., are observed.

Figure 1:
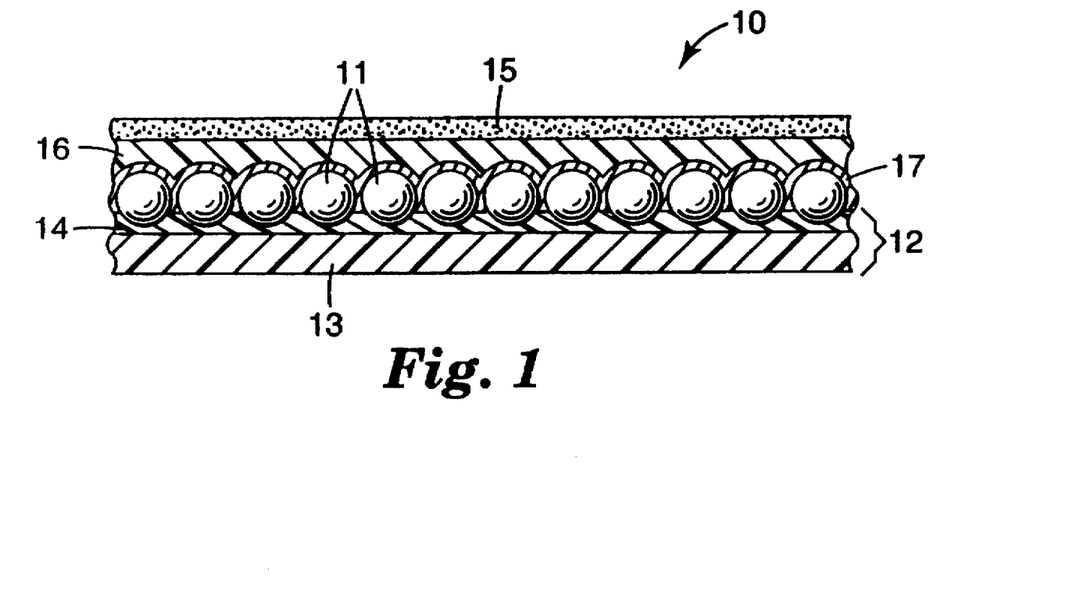
FIG. 1 is an enlarged sectional view through a portion of a retroreflective transfer sheet of the present invention having a layer of a transfer adhesive comprising a plastisol and a layer of a binder resin.
Figure 2:
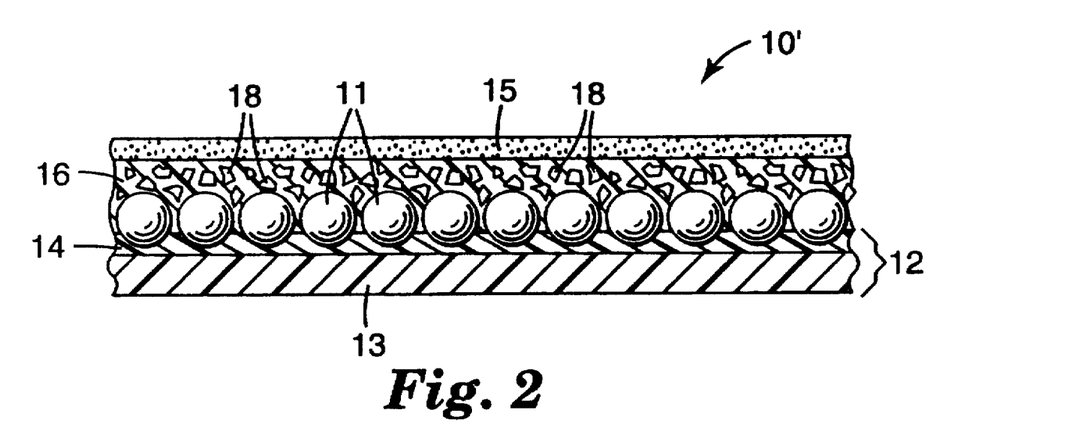
FIG. 2 is an enlarged sectional view through a portion of an alternative embodiment of the retroreflective transfer sheet shown in FIG. 1.

One embodiment of a retroreflective transfer sheet 10 according to the present invention is shown in FIG. 1. An alternative embodiment of a retroreflective transfer sheet 10' is shown in FIG. 2. These transfer sheets 10 and 10' each include a layer of optical lens elements in the form of microspheres 11 disposed on a carrier 12, which includes a heat-resistant backing 13 and a heat-softenable layer 14. The microspheres 11 are partially and releasably embedded in the heat-softenable layer 14. Herein, the backing 13 with the heat-softenable layer 14 and microspheres 11 is referred to as a "base sheet material." On the side of the base sheet material with the microspheres 11 is a layer of a transfer adhesive 15 comprising a plastisol. Disposed between the transfer adhesive layer 15 and the microspheres 11 is a layer of a binder resin 16. The binder resin layer 16 improves the adhesion of the material in the transfer adhesive layer 15 to the microspheres 11.

This retroreflective transfer sheet is used by laying it on a substrate, with the transfer adhesive layer placed against the substrate, adhering the transfer adhesive layer to the substrate through the application of heat, and then stripping the backing and heat-softenable layer away. This leaves the retroreflective applique laminated to the substrate. It includes a layer of optical lens elements partially embedded in and protruding from the front surface ("front" referring to the side of the applique facing away from the substrate) of a binder resin layer, and a transfer adhesive layer disposed on the rear surface of the binder resin layer.

The backing 13 is preferably made of a material that does not melt or substantially degrade upon exposure to temperatures below about 210° C. Examples of suitable heat-resistant materials include polyethylene terephthalate and Kraft paper. Typically, polyethylene terephthalate is used when the microspheres are coated with a layer of aluminum and Kraft paper is used when the microspheres are coated with a layer of a dielectric material, although either backing material may be used with both types of coating on the optical lens elements. The heat-softenable layer 14 is firm and nontacky such that the optical lens elements can be easily removed from it during application of the applique. Preferably, it is made of a material that softens at a temperature of at least about 95° C. Examples of suitable heat-softenable materials include waxes, silicones, polyesters, polysulfones, polyvinyl chloride, and polyolefins such as low density polyethylene, polypropylene, polybutylene, and the like.

The term "optical lens elements" means discrete elements capable of altering the direction of light so that, in conjunction with specular reflective material, a portion of incident light can be retroreflected. The optical lens elements are made of a material that is preferably substantially transparent so as to maximize the amount of incident light retroreflected. As used herein, "transparent" means capable of transmitting light. Preferably, the optical lens elements are made of a material that is capable of transmitting at least about 80% of the intensity of incident light in the visible spectrum (about 400–700 nanometer wavelength). More preferably, the optical lens elements are made of a material that is capable of transmitting about 90% of the intensity of light in the visible spectrum. The optical lens elements are typically made of glass, although nonvitreous ceramic compositions or synthetic resins can also be used. Glass and ceramic optical elements are preferred because they tend to be harder and more durable. Typically, the optical lens elements are substantially colorless, but they can be tinted or colored if desired.

The optical lens elements can be microspheres that are preferably substantially spherical in shape for substantially uniform and efficient retroreflection. Typically, microspheres suitable for use in the present invention have a diameter of about 30–200 micrometers, preferably about 60–100 micrometers, and more preferably about 40–90 micrometers. Microspheres smaller than about 30 micrometers in diameter tend to provide lower levels of retroreflection, and microspheres larger than about 200 micrometers tend to impart undesirable texture and/or flexibility. Preferably, the microspheres are substantially uniform in size, i.e., within about 25% in diameter. Preferably, these microspheres have an index of refraction of about 1.7–2.0. Examples of microspheres that can be used in the present invention are disclosed in, for example, U.S. Pat. No. 4,931,414 (Wood et al.); U.S. Pat. No. 4,772,511 (Wood et al.); U.S. Pat. No. 4,758,469 (Lange); U.S. Pat. No. 4,564,556 (Lang et al.); U.S. Pat. No. 4,367,919 (Tung et al.); and U.S. Pat. No. 4,192,576 (Tung et al.).

Referring to FIGS. 1 and 2, the microspheres 11 are packed in close proximity. Preferably, they are packed as closely as possible in their closest hexagonal arrangement, to achieve high retroreflective brightness. They are typically thermally embedded in the heat-softenable layer 14 to a depth of about 25–50%, preferably about 40–50%, of their diameter. This can be done by a variety of methods, such as by passing the carrier 12 and layer of micro spheres 11 through a tunnel oven, for example, set at a temperature of about 95°–135° C.

The retroreflective properties of the applique of the present invention is provided in one of two general ways. Referring to FIG. 1, one such method includes the use of a layer of specular reflective material 17 such as a specular reflective metal or a dielectric mirror coated on the microspheres 11. Herein, the backing 13 with the heat-softenable layer 14 and microspheres 11 with the layer of specular reflective material 17 is referred to as a "vapor coated sheet material." In this embodiment, the specular reflective material is coated only on the surface of the microspheres that protrudes from the heat-softenable layer. Thus, when the applique is applied to a substrate, the rear surface of the microspheres (the surface embedded in the binder resin layer) is coated with the specular reflective material.

Referring to FIG. 2, another method includes the use of reflective flakes 18 distributed throughout the binder resin layer 16. Additionally, or alternatively (although this is less desirable), the reflective flakes can be distributed throughout the transfer adhesive layer. Thus, in either of these embodiments, the microspheres are not coated with a specular reflective material and the base sheet material on which the binder resin and the transfer adhesive are coated (or imagewise printed) does not include any specular reflective material. Rather, the specular reflective material is mixed with the binder resin, for example, prior to its application to the base sheet material. It should be understood, however, that reflective flakes can be used in combination with optical lens elements coated with dielectric layers.

Referring to FIG. 1, a variety of metals can be used to provide a specular reflective layer 17. These include aluminum, silver, chromium, gold, nickel, magnesium, and the like, in elemental form, and combinations thereof. In some instances, such as for aluminum, at least a portion of the metal can be in the form of a metal oxide and/or hydroxide. Aluminum and silver are the preferred metals for use in a reflective layer because they tend to provide the highest retroreflective brightness. Aluminum is more preferred because it generally provides better laundering durability when adhered to a glass optical element. The metal coating can be produced by vacuum or chemical deposition or electroless plating. The metal layer should be thick enough to reflect incoming light. Typically, the reflective metal layer is about 50–150 nanometers thick.

In lieu of, or in addition to, a reflective metal layer, a dielectric mirror can be used as a specular reflective material. The dielectric mirror can be similar to known dielectric mirrors disclosed, for example, in U.S. Pat. No. 3,700,305 (Bingham) and U.S. Pat. No. 4,763,985 (Bingham). Such mirrors typically include a number of layers of at least two different dielectric materials. When using a dielectric mirror, the optical lens elements typically have a refractive index $n_2$ and have one or more layers of transparent material disposed thereon that has a refractive index $n_1$, and the opposite face of the layer(s) of transparent material is in contact with one or more layers of material having a refractive index $n_3$, where both $n_2$ and $n_3$ have a refractive index of at least 0.1, preferably at least 0.3, higher or lower than $n_1$. The layers of transparent material typically have an optical thickness corresponding to odd numbered multiples (1, 3, 5, 7 . . . ) of about one-quarter wavelength of light in the wavelength range of about 380–1,000 nanometers. Thus, either $n_2 > n_1 < n_3$ or $n_2 < n_1 > n_3$, and the materials on either side of the transparent layer(s) can be either both higher or both lower in refractive index than $n_1$. When $n_1$ is higher than both $n_2$ and $n_3$, $n_1$ is preferably about 1.7–4.9, and $n_2$ and $n_3$ are preferably about 1.2–1.7. Conversely, when $n_1$ is lower than both $n_2$ and $n_3$, $n_1$ is preferably about 1.2–1.7, and $n_2$ and $n_3$ are preferably about 1.7–4.9. The dielectric mirror preferably comprises a contiguous array of materials, at least one being in layer form, having an alternating sequence of refractive indices. In a preferred embodiment the contiguous array has 2–7 layers, preferably 3–5 layers, adjacent to the lens element. A dielectric mirror can provide very good retroreflectivity, although it typically is not as efficient a reflector as is a reflective metal layer, unless a very large number of layers are used. Furthermore, a dielectric mirror tends to wash away more readily than does a reflective metal layer.

Among the many compounds that can be used in providing transparent materials within the desired refractive index are: high index materials such as $CdS$, $CeO_2$, $CsI$, $GaAs$, $Ge$, $InAs$, $InP$, $InSb$, $ZrO_2$, $Bi_2O_3$, $ZnSe$, $ZnS$, $WO_3$, $PbS$, $PbSe$, $PbTe$, $RbI$, $Si$, $Ta_2O_5$, $Te$, $TiO_2$; low index materials such as Al₂O₃, AlF₃, CaF₂, CeF₃, LiF, MgF₂, Na₃AlF₆, ThOF₂, elastomeric copolymers of perfluoropropylene and vinylidene fluoride, and the like. Other materials are reported in *Thin Film Phenomena*, K. L. Chopra, page 750, McGraw-Hill Book Company, New York, N.Y. (1969). A preferred dielectric mirror contains succeeding layers of cryolite (Na₃AlF₆) and zinc sulfide.

Another method for making the appliques of the present invention retroreflective includes the use of reflective flakes distributed throughout the binder resin layer, which is described in more detail below. Referring to FIG. 2, reflective flakes 18 are shown in a binder resin layer 16 (not shown to scale). The reflective flakes are preferably metal flakes such as aluminum, bronze, or gold flakes, or nacreous pigment particles such as pearlescent pigments as disclosed in U.S. Pat. No. 3,758,192 (Bingham). The reflective flakes are microscopic in size. Because the reflective flakes are so much smaller than the microspheres, they can generally conform to the surfaces of the microspheres. Preferably, the reflective flakes are ellipsoidal in shape rather than rectangular. A suitable aluminum flake paste is available under the trade designation "MIRAL" 80,000/A/cx/70–30 from A. Van Lerberghe, Elleboogstraat 7, 8500 Kortrijk, Belgium. Several other aluminum pastes and powders are quite suitable, including, for example, those available under the trade designations "SUPER FINE P" and "ETERNABRITE 601-1" from Silberline Manufacturing Co., Inc., Tamaqua, Pa., and "CHROMAL X," "PCR 212," "PCA 501," from Obron Atlantic, Painesville, Ohio.

Referring to FIG. 1, the surfaces of the microspheres protruding from the heat-softenable layer 14 have a binder resin layer 16 and a transfer adhesive layer 15 disposed thereon to form a retroreflective applique. As discussed above, this transfer adhesive layer comprises a vinyl plastisol. The transfer adhesive layer 15 is of a sufficient thickness to bond to the microspheres and to a substrate, without unnecessarily stiffening the applique. Thus, the thickness can vary depending on the diameter of the microspheres and the type of substrate. For example, when the sheet material 10 is intended to be used in transferring a design to a fabric substrate, there should be enough material in the transfer adhesive layer 15 to penetrate the fabric and thereby attach the transferred adhesive to the fabric. Typically, the transfer adhesive layer 15 has a thickness of about 1–250 micrometers, preferably about 50–150 micrometers.

If the retroreflective applique is in the form of a specific image, the binder resin layer and the transfer adhesive layer are typically formed by "printing" (such as screen printing) the adhesive composition in an imagewise pattern. Thus, only a portion of the layer of the optical lens elements would be covered by the binder resin layer and the transfer adhesive layer. The term "printing" or "printed" is used herein to include a variety of specific imaging processes, applied by hand, machine, or common mechanical or electronic methods, including spraying, printing, lithographing, screen printing, hand painting, or other suitable application processes. The adhesive composition is printed onto a layer of a binder resin that improves the adhesion of the adhesive composition to the optical elements, with or without the reflective layer.

Referring to FIGS. 1 and 2, if a layer of a vinyl plastisol transfer adhesive is directly applied to the optical lens elements, or to the specular reflective layer coated on the optical lens elements, and the applique is laminated to fabric, the retroreflective brightness of the applique is greatly reduced upon washing the fabric, typically by the tenth wash. Typically, after the tenth wash according to the procedure described in the Examples Section, less than about 25% of the initial brightness is retained. This is because plastisols do not adhere well to glass, metals, metal oxides or hydroxides, or metal complexes used in dielectric materials (an exception to this are the carboxylated vinyl plastisols; however, they are generally too viscous to use in imagewise printing operations). When the plastisol is coated on a binder resin prepared from a polyester or a polyurethane, and an isocyanate-functional hardener, however, home wash durability is dramatically improved.

The binder resin 16 has a viscosity that is suitable for imagewise coating and conforms well to the microspheres. It is often referred to as an "ink," an "extender base," a "clear," or a "mixing clear" in the art of screen printing, and is typically used for extending the use of more expensive colored inks. The binder resin used herein is a two-part resin composition and is prepared from ingredients that include a polyester resin or a polyurethane resin and an isocyanate-functional hardener. Although this is referred to as a "two-part" resin, it can include other components such as a retarder, thinner, and organic solvents, for example.

Suitable polyester resins include, but are not limited to, a polyester of weight average molecular weight 30,000 prepared from phthalic acid isomers; 2,2-dimethyl-1,3-propanediol; 1,6-hexanediol; and trimethylolpropane. These are particularly desirable because they adhere well to the surfaces of the microspheres. Examples of suitable polyester resins are available under the trade designations "NYLOBAG" or "NYLOTEX" from Sericol Group Limited, Westwood Road, Broadstairs, Kent CT10 2PA, UK. A suitable two part urethane resin is available from Naz-Dar/KC, Lenexa, Kans. as No. 223900.

Suitable isocyanate-functional hardeners include, but are not limited to, toluene diisocyanate, methylene di(phenyldiisocyanate) hexamethylene 1,6-diisocyanate, and hexamethylene diisocyanate. A suitable isocyanate-functional hardener is available under the trade designation "NB 386" (hexamethylene diisocyanate) from Sericol Group Limited, Westwood Road, Broadstairs, Kent CT10 2PA, England, or "NB 70" from Naz-Dar/KC, Lenexa, Kans. The amount of hardener used in the binder resin composition is typically determined by the desired properties of the applique, and can be readily determined by one of skill in the art. For general purposes, about 2–5% by weight (wt-%) hardener is used, based on the total weight of the binder resin composition. Increasing levels of hardener lead to harder and stiffer appliques that are more easily cracked and less flexible than those with lower levels of hardener. If less than about 2 wt-% of the hardener is used, however, appliques result that have insufficient cohesion to withstand abrasion and laundering.

The binder resin composition typically includes one or more organic solvents, such as naphtha, naphthalene, 2-butoxyethanol, and the like, that is usually provided with the polyester or polyurethane resin, for example. Depending on the demands of the image or the climate, the binder resin can also include a suitable retarder and/or thinner. A retarder is typically used to slow the evaporation of volatile binder resin components. This is particularly necessary in hot climates for screen printing operations. Typically, a retarder is an organic solvent that is nonreactive with the components of the binder resin composition and has a higher boiling point than the solvents present in the binder resin. A suitable retarder is light aromatic naphtha (petroleum). A thinner is typically used to adjust the viscosity of the binder resin composition. Typically, a thinner is an organic solvent that is nonreactive with the components of the composition. A suitable thinner is ethylene glycol monobutyl ether acetate. One of skill in the art of printing typically can readily determine the amount of retarder and/or thinner desired in the binder resin composition.

The transfer adhesive composition and the binder resin composition are usually printed in a reverse image on a layer of optical lens elements, which protrude from a layer of heat-softenable material on a carrier, so that a positive image is formed when the applique is transferred to a substrate. A two-step printing process is used wherein the transfer adhesive composition is printed on the image formed from the binder resin composition in register. By "in register," it is meant that the images overlap substantially exactly such that they are generally lined up with each other.

Specifically, in this two-step process, after the binder resin is printed on the optical lens elements, it is dried for at least about two hours, preferably for at least about twelve hours, and more preferably for at least about 24 hours. During this time, the isocyanate-functional hardener crosslinks the resin and the solvent(s) evaporate. Subsequently, the transfer adhesive composition is printed on the image formed by the binder resin composition, and it is dried, typically in an oven, preferably in a tunnel oven, so that the temperature of the entire thickness of the film making up the image reaches at least about 80°–120° C. Typically, this takes about 10–20 seconds. The resulting dried material is in a "gel" state and has sufficient internal cohesion so it can be handled without damage. It is, however, only partially progressed toward its final fused state, which occurs during the application of the applique to the substrate. During lamination of the applique to the substrate, temperatures of about 150°–190° C. are used for about 5–30 seconds.

The appliques applied to articles of clothing, for example, using the transfer sheets of the present invention are improved over conventional retroreflective appliques because they are easier to manufacture, they are more flexible and stretchable, and they demonstrate improved wash durability. For example, the use of a plastisol transfer adhesive eliminates the use of cumbersome and messy powdered transfer adhesives, which are hard to control, difficult to clean up, and may be physical irritants to the operators. Elimination of the powdered transfer adhesive also eliminates the processing step of brushing the extraneous powder from nonimaged areas the day after printing, and also eliminates the processing step of melting the powdered transfer adhesive left in the imaged areas of the newly brushed transfers.

Colorants, such as pigments and dyes, can be included within the transfer adhesive layer, the binder resin layer, or both. Colorant in the transfer adhesive layer is preferred when using dielectric vapor coated sheet material, whereas colorant in the binder resin layer is preferred when using flakes as the specular reflective material. When colorant is in the transfer adhesive layer, however, the binder resin layer is generally transparent. A wide variety of permutations are possible, particularly for multicolored appliques. It will be understood by one of skill in the art that a wide variety of multicolored appliques can be prepared using only a single layer of the plastisol transfer adhesive described herein. For example, the multilayered appliques described in U.S. Pat. No. 5,344,705 (Olsen) can be prepared using the plastisol transfer adhesive described herein. If desired, the transfer adhesive layer can be formed by successively printing (typically screen printing in an imagewise pattern) and drying a plurality of colorant adhesive compositions onto the binder layer. In other words, the transfer adhesive layer 15 (FIGS. 1 and 2) can include a number of different colors, one for each color of a multicolored design, arranged in exact register with the corresponding image segments formed by the binder layer. Alternatively, it can include a number of different colors mixed together to form a "hybrid" color in a single layer, each colored area of the image being formed by a separately printed and gelled adhesive composition. This eliminates the need to print two overlapping layers of different colors to achieve "hybrid" colors.

Other additives such as fillers, thermal stabilizers, light stabilizers, antioxidants, flame retardants, flow modifiers, plasticizers, and elastomers can be included in the adhesive transfer layer and/or the binder resin layer. The selection of any of these additives is determined by a number of processing and durability factors; however, laundering durability is a particularly important factor.

The appliques of the present invention can be transferred to a fabric or other substrate by heat and pressure. The appliques can be applied to a variety of fabrics such as cotton, polyester, cotton/polyester blends, fabrics containing "LYCRA" fibers, as well as fire retardant fabrics such as "PBI/KEVLAR" and "NOMEX" fabrics. The appliques of the present invention can also be applied to vinyl surfaces and other plastic-like materials, such as the side of a truck, mud flaps, and protective clothing, for example. They can be applied to an article of clothing directly or transferred to a fabric substrate, for example, and the fabric sewn onto the article of clothing if desired.

Figure 3:
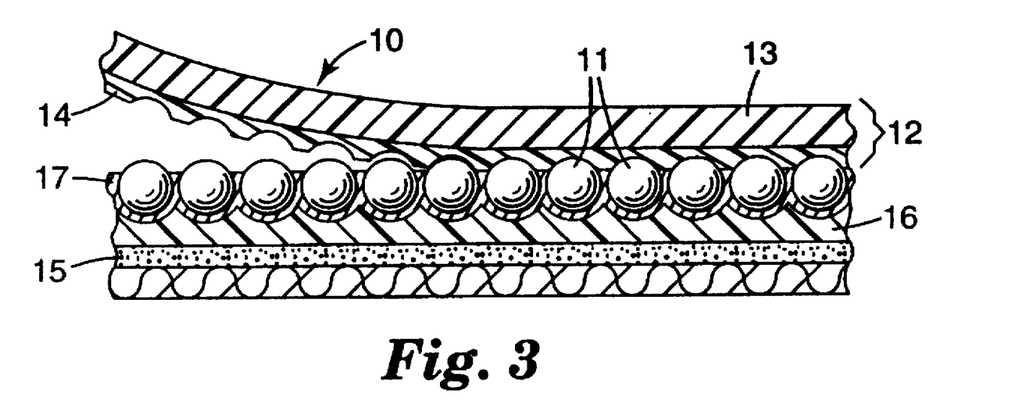
FIG. 3 illustrates schematically in a sectional view removal of the carrier from the transfer sheet shown in FIG. 1 after having been laminated to a substrate.

In a typical application, a transfer sheet is placed so that the image is facing and in contact with the chosen substrate, and then placed in a thermal lamination device. Typical lamination conditions include a temperature of about 150°–190° C., a pressure of about 0.7–4.2 Kg/cm$^2$, and a time of about 5–30 seconds. After this, the construction is allowed to cool to room temperature and the carrier material is removed from the applique as shown in FIG. 3.

Although the retroreflective sheet of the present invention preferably includes imagewise printed appliques, it can also be in the form of roll goods that do not have specific images thereon. The same components that are used in an imagewise manner to form retroreflective images can be coated, by knife coater or other coating means, on a carrier to produce retroreflective roll goods.

The present invention also provides a kit that can be used for preparing the retroreflective applique transfer sheets of the present invention. A typical kit includes a base sheet material (e.g., a carrier having a backing and a heat-softenable material with optical lens elements embedded in the heat-softenable material), a binder resin composition (e.g., an isocyanate-functional hardener and a polyester, which are supplied in separate containers such that they can be mixed immediately prior to application to the base sheet material), and a transfer adhesive composition (e.g., a vinyl chloride plastisol). The retroreflective properties of the applique can be supplied either in the form of a coating on the optical lens elements or as a separate container of reflective flakes for mixing with the binder resin composition or the transfer adhesive composition.

Advantages and other properties and details of this invention are further illustrated in the following examples. It is to be expressly understood, however, that while the examples serve this purpose, the particular ingredients and amounts used and other conditions are not to be construed in a manner that would unduly limit the scope of this invention. The examples selected for disclosure herein are merely illustrative of how to make preferred embodiments of the invention and how the preferred embodiments generally perform.

EXAMPLES

Retroreflective Brightness Test

The coefficient of retroreflection $R_A$, reported in candelas per lux per square meter ($cd/lux/m^2$), was measured using standardized test ASTM E 810-93b (1993). The entrance angle used in ASTM E 810-93b was −4° and the observation angle was 0.2°.

Home Laundering Durability Test

Fabrics having the samples laminated thereto were subjected to a series of home laundering tests wherein each sample was subjected to the number of wash cycles stated in the tables. Each sample was washed for five consecutive cycles in a Maytag Model LS7804 automatic washing machine using the following settings: "Regular" fabric (setting 10); "Large" load; and "Hot/Cold" temperature. The washing machine was attached to a temperature-controlled water supply providing an initial water temperature of about 43° C. Forty grams of a standard detergent, obtained from the American Association of Textile Chemists and Colorists (AATCC) Technical Center, P.O. Box 12215, Research Triangle, N.C. 27709, were used for each wash cycle. After every fifth wash/rinse cycle, each sample was tumble-dried in a Maytag Model LS7804 dryer until the total load was dried using the following settings: 60° C. temperature; and "Regular" fabric. Each sample was then tumbled for a 5–10 minute cooling period in the dryer with the heat turned off. After each drying cycle, each sample was tested for retroreflective performance in accordance with ASTM E 810-93b.

Flexibility

These measurements were made at one corner of a standing rectangular solid, the corner consisting of two vertical planar surfaces and a third, horizontal planar surface, all three planar surfaces being mutually perpendicular. A protractor and a single edged razor blade were affixed to the two vertical surfaces perpendicular to each other, and at the corner where they meet, of the rectangular solid. The single edged razor blade was affixed to one vertical surface such that the sharp, narrow edge was parallel to the edge of the horizontal surface of the solid and one corner of the blade was touching the corner of the solid block. The protractor was affixed to the other vertical surface in such a way that the cross point of alignment marks was at the edge of the horizontal surface and the 90 degree mark was extended beyond the horizontal plane and coplanar with it. The purpose of the upward facing sharp edge of the razor blade was to support the test piece at a line as coplanar as possible with the vertical face to which the razor blade was affixed. The purpose of the protractor was to measure the angle between the horizontal surface and the unsupported end of a test article.

To make measurements, a rectangular test article of desired dimensions was prepared by drawing guide lines across its narrow dimension, perpendicular to its longer dimension, at carefully measured distances from one end (narrow dimension) of the test article. The purpose of these lines was to allow a uniform length of the test article to be extended, unsupported, from the horizontal surface of the test fixture. The test article was allowed to rest under ambient conditions on the horizontal surface of the test fixture for five minutes then, without raising it off the surface, the test article was positioned so that its longer dimension was parallel with and coincident with the edge of the horizontal surface and so that the desired guide line was resting directly over the sharp edge of the razor blade. A convenient weight was then placed on the portion of the test article remaining on the horizontal surface, the weight being placed so that its edge was coincident with the guide mark. In this position a known length of the rectangular test article was supported by the horizontal surface and held tightly in place by the weight while another known length of the test article extended unsupported from the horizontal surface. The test article was allowed to rest in this position for five minutes. Then the angle made by the horizontal surface of the test fixture, passing through the sharp edge of the razor blade as the vertex, to the end of the test article where it crossed the outer circumference of the protractor was read. This angle was taken as a measure of the flexibility of the test article, the larger the angle, the more flexible the applique.

Examples 1–10 and Comparative Examples A–L

For preparation of the appliques of the present invention, a vapor coated sheet material, which consisted of a polyester film backing covered with a heat-softenable layer of low density polyethylene having microspheres embedded therein to about 30–40% of their diameters, was used. The microspheres were coated with aluminum metal. This material is commercially available from 3M Co. Personal Safety Products Division, St. Paul, Minn., under the trade designation "SCOTCHLITE" reflective graphic film.

For each of the examples, a mixture of a polyester extender base available under the trade designation "NYLOBAG NB-381," an isocyanate hardener available under the trade designation "NYLOBAG NB-386," and an organic-solvent based retarder available under the trade designation "NYLOBAG NB-RT" (in a ratio of about 100 parts to 2.2 parts to 15 parts), all of which are available from Sericol Group Limited, Westwood Road, Broadstairs, Kent CT10 2PA, UK, was stirred until a smooth, homogenous paste was obtained. The resulting paste was printed through a 110–305 T mesh/inch (40–120 T mesh/cm) screen bearing the desired reverse transfer image using a medium (60–65 Shore A durometer) squeegee and small off contact distance, onto the vapor coated sheet material described above. The resulting printed vapor coated sheet material was air dried under ambient conditions overnight.

The printed vapor coated sheet material was then printed with the same image in exact register with a vinyl plastisol screen printable transfer adhesive (used as purchased) through an 83–230 T mesh/inch (36–120 T mesh/era) screen. The trade designations and sources of the plastisols shown in Table 1 are listed below. The resulting image was heated to its gelling point with "TEXAIR" Model 30 continuous belt oven (available from Screen Printing Equipment Co., Chicago, Ill.) operating with forced air temperature set below room temperature so that the heated forced air is turned off, infrared set point of 594° C., and a belt speed to allow 30–40 seconds residence time inside the entire oven enclosure.

The retroreflective appliques were transferred to a woven 65/35 polyester/cotton blend fabric substrate (100 $gtm^2$) by placing the printed image toward the fabric into a Hix Model N-800 heat lamination press (available from Hix Corp., Pittsburg, Kans.) set to operate at about 168° C. for about 20 seconds. The air pressure in the air line feeding the heat lamination press was set at 2.8 $Kg/cm^2$, which also represented the pressure at the platen. When the construction cooled completely to room temperature, the release liner was removed from the fabric substrate.

Representative vinyl-type plastisol transfer adhesives used are listed in Table 1 along with corresponding home wash durability data. Example 1 was made with a vinyl plastisol available under the trade designation "PLUS 9090" from Union Ink Company, Inc., Ridgefield, N.J., printed over a three hour old polyester-based binder resin image, whereas Comparative Example C was made with the same vinyl plastisol applied directly to the vapor coated transfer sheet. Example 2 was made with a vinyl plastisol available under the trade designation "TRANSFLEX 10210TF" from Flexible Products Company, Chicago, Ill., over a thirty two hour old polyester-based binder resin image, whereas Comparative Example D was made with the same vinyl plastisol applied directly to the vapor coated transfer sheet. Example 3 was made with a vinyl plastisol available under the trade designation "PLAX 885" from Advance Process Supply Company, Chicago, Ill., over a six hour old polyester-based binder resin image, whereas Comparative Example E was made with the same vinyl plastisol applied directly to the vapor coated transfer sheet. Example 4 was made with a vinyl plastisol available under the trade designation "D-2161" from Plast-O-Meric SP, Inc., Sussex, Wis., over a thirty hour old polyester-based binder resin image, whereas Comparative Example F was made with the same vinyl plastisol applied directly to the vapor coated transfer sheet. Example 5 was made with a vinyl plastisol available under the trade designation "SX 863" from Plast-O-Meric SP, Inc., over a twenty four hour old polyester-based binder resin image, whereas Comparative Example G was made with the same vinyl plastisol applied directly to the vapor coated transfer sheet. Example 6 was made with a vinyl plastisol available under the trade designation "SX 864A" from Plast-O-Meric SP, Inc., over a twenty four hour old polyester-based binder resin image, whereas Comparative Example H was made with the same vinyl plastisol applied directly to the vapor coated transfer sheet. Example 7 was made with a vinyl plastisol available under the trade designation "SX 864B" from Plast-O-Meric SP, Inc., over a twenty four hour old polyester-based binder resin image, whereas Comparative Example I was made with the same vinyl plastisol applied directly to the vapor coated transfer sheet. Example 8 was made with a vinyl plastisol available under the trade designation "SX 864C" from Plast-O-Meric SP, Inc., over a twenty four hour old polyester-based binder resin image, whereas Comparative Example J was made with the same vinyl plastisol applied directly to the vapor coated transfer sheet. Example 9 was made with a vinyl plastisol available under the trade designation "SX 864D" from Plast-O-Meric SP, Inc., over a twenty four hour old polyester-based binder resin image, whereas Comparative Example K was made with the same vinyl plastisol applied directly to the vapor coated transfer sheet. Example 10 was made with a vinyl plastisol available under the trade designation "SX 864E" from Plast-O-Meric SP, Inc., over a forty four hour old polyester-based binder resin image, whereas Comparative Example L was made with the same vinyl plastisol applied directly to the vapor coated transfer sheet.

Comparative Example A represents an applique made according to the teachings of U.S. Pat. No. 5,344,705 (Olsen). A mixture of 50.0 grams of a polyester extender base available under the trade designation "NYLOBAG NB 381," 7.50 grams of an organic solvent-based retarder available under the trade designation "NYLOBAG NB RT," and 1.10 grams of an isocyanate hardener available under the trade designation "NYLOBAG NB 386" (all of which are available from Sericol Group Limited, Westwood Road, Broadstairs, Kent CT10 2PA, UK), was stirred until homogeneous and then printed through a 110 T mesh/inch (43 T mesh/era) printing screen onto the aluminum surface of the vapor coated sheet material described above. Immediately after printing, and while the image was still wet, a uniform layer of powdered hot melt transfer adhesive "571D" (available from 3M Co. Personal Safety Products, St. Paul, Minn.) was applied and most of the excess powdered transfer adhesive that did not adhere to the image was allowed to fall off the sheet. The resulting powdered image was allowed to stand at room temperature overnight to dry. The resultant firm image was brushed to remove any remaining granules of the powdered transfer adhesive in the nonimaged locations. The freshly brushed images were heated in a "TEXAIR" Model 30 tunnel oven with a forced air thermostat setting of 38° C., an infrared panel setting of 505° C. and set for total residence time of about 98 seconds, or enough time to cause the surface of the powdered transfer adhesive to melt. When the transfer image returned to room temperature it was placed in a Prix Model N-800 heat transfer machine with the image facing a piece of 65/35 polyester/cotton fabric (100 g/m$^2$) and heated to 160° C. for 18 seconds at 2.8 Kg/cm$^2$. When the construction returned to room temperature the liner was removed from the construction. The samples were washed as described above and the retroreflective brightness were measured as described above.

The data for Comparative Example B was taken from Example 1 of U.S. Pat. No. 4,102,562 (Harper et al.), which included a printing layer of a polyurethane and an adhesion-promoting silane disposed between microspheres and a layer of a vinyl plastisol. Differences between laundering conditions disclosed therein and the conditions used to test the appliques of the present invention are minor and have to do with the washing machine model and the detergent used. Harper et al. report that laundering was done in a "MAYTAG automatic washer using hot water and TIDE detergent." The model number of the MAYTAG machine used is not known, although it is known that the machine was an older model than the machine used for the present invention. The wash regimens of Harper et at. and the present invention are substantially similar, and thus comparable. Differences in lamination conditions used by Harper et al. (Comparative Example B) and those used to apply the appliques of the present invention are minor. Harper et al. used a heat laminating machine set at 175° C. for 30 seconds and 205° C. for 10 seconds, respectively, and applied the appliques to cotton and cotton/polyester blend fabrics. The appliques of the present invention were laminated to 65/35 polyester/cotton blend fabric (100 g/m$^2$) using a Hix model N-800 heat laminating machine at about 168° C. for about 20 seconds; however, as the lamination temperature for the present invention increased over the range of about 170°–205° C., the home laundry durability, as measured by percent of original brightness retained, improved (data not shown).

The data in Table 1 are listed as the percentage brightness retained after a number of washings. Each entry in the table is based on one measurement, except Examples 2, 3, and 4, which are an average of three tests.

TABLE 1

| Example | \ | \ | \ | \ | \ | Retained Brightness | \ | \ | \ | \ | \ | \ | \ | \ |
|---|---|---|---|---|---|---|---|---|---|---|---|---|---|---|
|  | 0 | 5 | 10 | 15 | 20 | 25 | 30 | 40 | 50 | 60 | 70 | 80 | 90 | 100 |
| Comparative A | 100 | 98 | 97 | 87 | 83 | 75 | 71 | 64 | 56 | 51 | 45 | | | |
| Comparative B | 100 | 40 | | 30 | | 25 | | 20 | 16 | | | | | |
| 1 | 100 | 100 | 91 | 83 | 77 | 73 | 68 | 61 | 56 | 51 | 44 | | | |
| Comparative C | 100 | 9[a] | | | | | | | | | | | | |
| 2 | 100 | 100 | 94 | | 89 | | 81 | 76 | 68 | | | | | |
| Comparative D | 100 | 56 | 22 | | 6 | | 2 | | | | | | | |
| 3 | 100 | 104 | 102 | | 99 | | 95 | 93 | 90 | | | | | |
| Comparative E | 100 | 10 | 4 | | | | | | | | | | | |
| 4 | 100 | 99 | 96 | | 90 | | 84 | | 77 | 71 | | | | |
| Comparative F | 100 | 17[b] | | | | | | | | | | | | |
| 5 | 100 | 108 | 102 | | 95 | | 89 | 90 | 84 | 81 | 76 | 74 | 71 | 70 |
| Comparative G | 100 | 10[c] | | | | | | | | | | | | |
| 6 | 100 | 103 | 99 | | 91 | | 84 | 84 | 78 | 73 | 66 | 65 | 60 | 57 |
| Comparative H | 100 | 3[c] | | | | | | | | | | | | |
| 7 | 100 | 102 | 98 | | 82 | | 81 | 81 | 73 | 69 | 62 | 60 | 57 | 54 |
| Comparative I | 100 | 3[c] | | | | | | | | | | | | |
| 8 | 100 | 105 | 100 | | 89 | | 82 | 78 | 68 | 63 | 56 | 55 | 56 | 52 |
| Comparative J | 100 | 36 | 8 | | | | | | | | | | | |
| 9 | 100 | 103 | 94 | | 81 | | 75 | 72 | 66 | 62 | 55 | 51 | 49 | 45 |
| Comparative K | 100 | 15[a] | | | | | | | | | | | | |
| 10 | 100 | | 90 | | 83 | | 76 | 69 | 65 | 60 | 59 | 56 | | |
| Comparative L | 100 | 1[c] | | | | | | | | | | | | |

[a]This amount of initial brightness was retained after only one home laundering.
[b]This amount of initial brightness was retained after only two home launderings.
[c]Not measured after five home launderings.

Example 11 and Comparative Example A

Data demonstrating the stiffness or flexibility of the retroreflective applique is shown in Table 2. Example 11 was prepared by mixing 65.8 grams of a polyester extender base available under the trade designation "NYLOBAG NB 381," 2.9 grams of an organic solvent based retarder available under the trade designation "NYLOBAG NB RT," and 1.4 grams of an isocyanate hardener available under the trade designation "NYLOBAG NB 386" (all of which are available from Sericol Group Limited, Westwood Road, Broadstairs, Kent CT10 2PA, UK). This mixture was stirred until homogeneous and then printed through a 156 T mesh/inch (61 T mesh/cm) printing screen onto the aluminum surface of the vapor coated sheet material described above. The resulting image was allowed to stand at room temperature for four days. A vinyl plastisol available under the trade designation "SX 864B" from Plast-O-Meric SP, Inc. was screen printed in exact register onto the same image through a 125 T mesh/inch (49 T mesh/cm) printing screen. The resulting transfer applique was gelled as described above in Examples 1–10 and Comparative Examples A–L and laminated to 65/25 polyester/cotton blend fabric as described in Examples 1–10 and Comparative Examples A–L.

Test strips of Comparative Example A and Example 11 measuring 0.4 cm×7.5 cm and 1.0 cm×6.0 cm were tested according to the flexibility test procedure described above. The deflection from horizontal, measured in degrees of angle of the unsupported test pieces is shown in Table 2. The angle of deflection from horizontal of the unsupported test piece is defined as a measure of the flexibility of the material. For each unsupported length, the greater degree of deflection, the more flexible and less stiff is the material. This data shows that the materials of the present invention are less stiff and more flexible than conventional appliques.

TABLE 2

| | Flexibility | | |
|---|---|---|---|
| Test Article Dimensions (cm) | Unsupported Extension (cm) | Comp. Example A (Angle of Deflection in Degrees) | Example 11 (Angle of Deflection in Degrees) |
| 0.4 × 7.5 | 1.0 | 0 | 0 |
| 0.4 × 7.5 | 2.0 | 0 | 1 |
| 0.4 × 7.5 | 3.0 | 1 | 4 |
| 0.4 × 7.5 | 4.0 | 2 | 12 |
| 0.4 × 7.5 | 5.0 | 7 | 24 |
| 0.4 × 7.5 | 6.0 | 14 | 43 |
| 0.4 × 7.5 | 7.0 | 22 | — |
| 1.0 × 6.0 | 1.0 | 0 | 0 |
| 1.0 × 6.0 | 2.0 | 0 | 2 |
| 1.0 × 6.0 | 3.0 | 1 | 11 |
| 1.0 × 6.0 | 4.0 | 3 | 23 |
| 1.0 × 6.0 | 5.0 | 5 | 40 |

Figure 4:
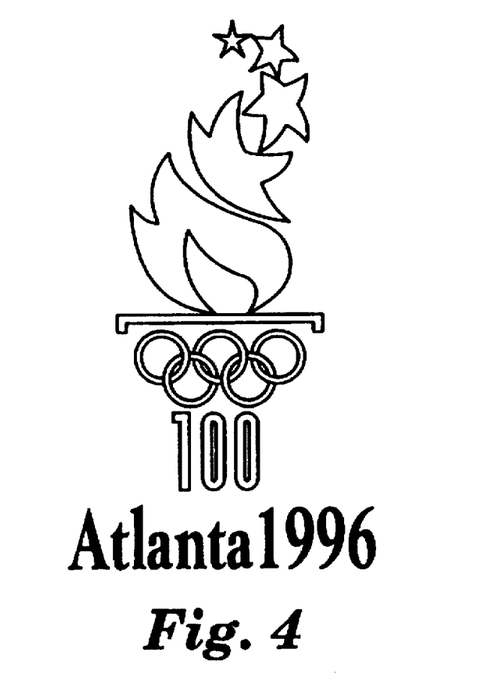
FIG. 4 is a top plan view of an illustrative emblem transferred onto a substrate according to the present invention.

Data demonstrating the stretchiness of the material of Example 11 and Comparative Example A is shown in Table 3. Appliques made in the standard test logo as shown in FIG. 4 were prepared and attached to medium weight LYCRA fabric. The length of several sections of the image, which represent various types of images expected in commerce, were measured while the test piece was at rest. The piece was grasped approximately 5 cm from the opposite ends of the test image and pulled apart along the grasping axis. When the image formed a crack that went completely through the image, separating it into two or more separate sections or islands, the extension was stopped and the length of the test image was measured again, while still under tension. The length to which the image could be extended before complete cracking is taken as a measure of the stretching ability of the article. Note that in no instance did the article of the present invention crack completely through the image. Rather, pinholes formed in the image through which the backing fabric could be seen. When tension was relaxed to the rest state, the comparative example retained its cracks while the pinholes of the article of the present invention closed to form a continuous image again. It is also noted that the 0.4 cm×8 cm bar feature was positioned in the logo so that its stretching axis was perpendicular to that of the other three examples. The data is also reported as the percentage increase in the size of the feature at the point at which pinholes, cracks, etc., were noticed. This was determined as follows: [(dimension at crack appearance—dimension at rest)/dimension at rest]×100. This illustrates that transfers of the present invention are able to stretch generally equally in both directions with the fabric.

that the invention is not to be limited to the above-described, but is to be controlled by the limitations set forth in the following claims and any equivalents thereof. It is also to be understood that the invention may be suitably practiced in the absence of any element not specifically disclosed herein.

What is claimed is:

1. A retroreflective applique comprising:
   (a) a layer of optical lens elements partially embedded in and protruding from the front surface of a binder resin layer; wherein the binder resin layer is prepared from ingredients comprising an isocyanate-functional hardener and a resin selected from the group consisting of a polyester resin and a polyurethane resin; and
   (b) a transfer adhesive layer comprising a vinyl plastisol disposed on the rear surface of the binder resin layer.

2. The retroreflective applique of claim 1 wherein the binder resin layer is prepared from a polyester resin and a hardener comprising hexamethylene diisocyanate.

3. The retroreflective applique of claim 1 wherein the vinyl plastisol comprises a vinyl resin made from vinyl chloride monomers.

4. The retroreflective applique of claim 1 wherein the vinyl resin comprises a copolymer made from monomers selected from the group consisting of vinyl chloride, vinyl acetate, vinyl ether, and mixtures thereof.

5. The retroreflective applique of claim 1 wherein the optical lens elements are coated with a specular reflective material on the surface embedded in the binder resin layer.

6. The retroreflective applique of claim 5 wherein the specular reflective material comprises a specular reflective metal.

TABLE 3

| Feature of Logo | Example | Stretchiness | | | Remarks |
|---|---|---|---|---|---|
| | | Dimension at Rest (cm) | Dimension at Crack Appearance (cm) | Dimension Increase (%) | |
| Five pointed star | Example 11 | 2.0 | 5.3 | 165 | Pinholes only |
| Five pointed star | Comp. Example A | 2.0 | 2.5 | 25 | Cracks at base of points |
| Long bar, 0.4 × 8 cm, perpendicular to others | Example 11 | 8.0 | 17.7 | 121 | Pinholes only |
| Long bar, 0.4 × 8 cm, perpendicular to others | Comp. Example A | 7.6 | 8.5 | 11 | Two complete cracks formed |
| Numeral "1" in number "100" | Example 11 | 3.0 | 8.5 | 183 | Pinholes only |
| Numeral "1" in number "100" | Comp. Example A | 3.0 | 4.8 | 38 | Two complete cracks, one partial |
| Numeral "6" in number "1996" | Example 11 | 2.5 | 7 | 180 | Pinholes only |
| Numeral "6" in number "1996" | Comp. Example A | 2.5 | 3.2 | 28 | One complete crack in tail |

The complete disclosures of all patents, patent documents, and publications cited herein are incorporated by reference, as if individually incorporated. Various modifications and alterations may be made to the invention without departing from its spirit and scope. Accordingly, it is to be understood 7. The retroreflective applique of claim 5 wherein the specular reflective material comprises a dielectric mirror.

8. The retroreflective applique of claim 7 wherein the binder resin layer includes a colorant.

9. The retroreflective applique of claim 7 wherein the binder resin layer is transparent and the transfer adhesive layer includes a colorant.

10. The retroreflective applique of claim 1 further including reflective flakes distributed throughout the binder resin layer.

11. The retroreflective applique of claim 10 wherein the binder resin layer further includes a colorant.

12. The retroreflective applique of claim 1 applied to a substrate.

13. The retroreflective applique of claim 12 wherein the substrate is a fabric substrate.

14. The retroreflective applique of claim 12 wherein the substrate is an article of clothing.

15. The retroreflective applique of claim 1 which is capable of retaining at least about 90% of its initial retroreflectivity after being laminated to 65/35 polyester/cotton blend fabric (100 g/m$^2$) at about 168° C. and about 2.8 Kg/cm$^2$ pressure for about 20 seconds and subjected to home laundering conditions five times.

16. The retroreflective applique of claim 1 which is capable of:
  (a) retaining at least about 50% of its initial retroreflectivity after being laminated to 65/35 polyester/cotton blend fabric (100 g/m$^2$) at about 168° C. and about 2.8 Kg/cm$^2$ for about 20 seconds and subjected to home laundering conditions five times; and
  (b) retaining at least about 40% of its initial retroreflectivity after being laminated to 65/35 polyester/cotton blend fabric (100 g/m$^2$) at about 168° C. and about 2.8 Kg/cm$^2$ for about 20 seconds and subjected to home laundering conditions thirty times.

17. A retroreflective applique transfer sheet comprising the retroreflective applique of claim 1 and a carrier comprising a layer of a heat-softenable material; wherein the layer of optical lens elements is partially embedded in the heat-softenable material.

18. The retroreflective applique transfer sheet of claim 17 wherein the binder resin layer is disposed on the optical lens elements in an imagewise fashion and the transfer adhesive layer is disposed on the binder resin layer in an imagewise fashion in register with the binder layer image.

19. The retroreflective applique transfer sheet of claim 17 wherein the binder resin layer is prepared from a polyester resin and a hardener comprising hexamethylene diisocyanate.

20. The retroreflective applique transfer sheet of claim 17 wherein the vinyl plastisol comprises a vinyl resin made from vinyl chloride monomers.

21. The retroreflective applique transfer sheet of claim 17 wherein the vinyl resin comprises a copolymer made from monomers selected from the group consisting of vinyl chloride, vinyl acetate, vinyl ether, and mixtures thereof.

22. A kit for preparing a retroreflective applique comprising:
  (a) a base sheet material comprising:
    (i) a carrier comprising a heat-resistant backing and a layer of a heat-softenable material coated thereon; and
    (ii) a layer of optical lens elements partially embedded in and protruding from the heat-softenable material;
  (b) ingredients for preparation of a binder resin composition comprising:
    (i) an isocyanate-functional hardener; and
    (ii) a resin selected from the group consisting of a polyester resin and a polyurethane resin;
  wherein the binder resin composition is suitable for imagewise printing on the base sheet material; and
  (c) a transfer adhesive composition comprising a vinyl plastisol suitable for imagewise printing.

23. The kit of claim 22 wherein the binder resin composition comprises a polyester resin and a hardener comprising hexamethylene diisocyanate.

24. The kit of claim 22 wherein the vinyl plastisol comprises a vinyl resin made from vinyl chloride monomers.

25. The kit of claim 22 wherein the vinyl resin comprises a copolymer made from monomers selected from the group consisting of vinyl chloride, vinyl acetate, vinyl ether, and mixtures thereof.

26. The kit of claim 22 wherein the base sheet material is a vapor coated sheet material comprising:
  (a) a carrier comprising a heat-resistant backing and a layer of a heat-softenable material coated thereon;
  (b) a layer of optical lens elements partially embedded in and protruding from the heat softenable material; and
  (c) a specular reflective material coated on the surfaces of the optical lens elements protruding from the heat-softenable material.

27. The kit of claim 26 wherein the specular reflective material comprises a specular reflective metal.

28. The kit of claim 26 wherein the specular reflective material comprises a dielectric mirror.

29. The kit of claim 28 wherein the binder resin composition further includes a colorant.

30. The kit of claim 28 wherein the transfer adhesive composition further includes a colorant.

31. The kit of claim 22 further including reflective flakes for mixing with the binder resin composition or the transfer adhesive composition.

32. A method for preparing a retroreflective applique; the method comprising:
  (a) providing a base sheet material comprising:
    (i) a carrier comprising a heat-resistant backing and a layer of a heat-softenable material coated thereon; and
    (ii) a layer of optical lens elements partially embedded in and protruding from the heat-softenable material;
  (b) imagewise printing a binder resin composition on the base sheet material, wherein the binder resin composition is prepared from ingredients comprising:
    (i) an isocyanate-functional hardener; and
    (ii) a resin selected from the group consisting of a polyester resin and a polyurethane resin; and
  (c) imagewise printing a transfer adhesive composition comprising a vinyl plastisol in register with the image formed with the binder resin composition to form a retroreflective applique transfer sheet.

33. The method of claim 32 further including a step of laminating the retroreflective applique to the substrate.

34. The method of claim 32 wherein the base sheet material is a vapor coated sheet material comprising:
  (a) a carrier comprising a heat-resistant backing and a layer of a heat-softenable material coated thereon;
  (b) a layer of optical lens elements partially embedded in and protruding from the heat softenable material; and
  (c) a specular reflective material coated on the protruding surfaces of the optical lens elements.

35. The method of claim 32 wherein the binder resin composition further includes reflective flakes.

* * * * *

UNITED STATES PATENT AND TRADEMARK OFFICE
CERTIFICATE OF CORRECTION

PATENT NO.: 5,631,064

DATED: May 20, 1997

INVENTOR(S): Paul E. Marecki

It is certified that error appears in the above-identified patent and that said Letters Patent is hereby corrected as shown below:

Col. 6, line 61, "days" should read --clays--.

Col. 7, line 45, "beating" should read --bearing--.

Col. 16, line 59, "gtm²" should read --g/m²--.

Col. 18, line 6, "mesh/era)" should read --mesh/cm)--.

Col. 18, line 45, "at." should read --al.--.

Signed and Sealed this

Thirtieth Day of September, 1997

*Attest:*

BRUCE LEHMAN

*Attesting Officer*  Commissioner of Patents and Trademarks